Aug. 30, 1966  D. J. ROTH  3,269,489
FRICTION PAIR

Filed Oct. 19, 1964  2 Sheets-Sheet 1

INVENTOR.
DOUGLAS J. ROTH.
BY
ATTORNEY.

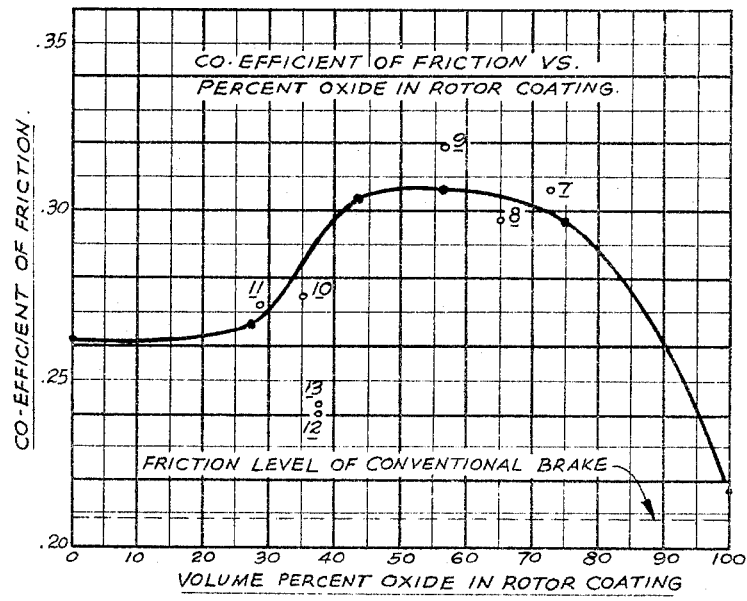
FIG_2
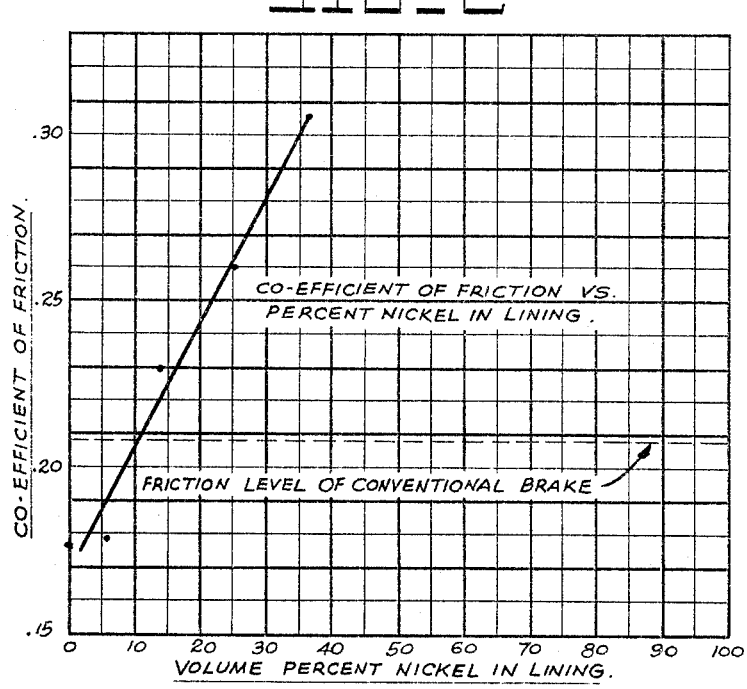
FIG_3

United States Patent Office 3,269,489
Patented August 30, 1966

3,269,489
FRICTION PAIR
Douglas J. Roth, South Bend, Ind., assignor to The Bendix Corporation, South Bend, Ind., a corporation of Delaware
Filed Oct. 19, 1964, Ser. No. 404,653
3 Claims. (Cl. 188—71)

The present invention relates to friction material composition of a pair rubbing friction surfaces adapted for use in high energy brake applications such as for aircraft and the like.

I have found that considerable improvement in high energy effectiveness between brake surfaces can be obtained by utilizing a nickel base friction material operating against an opposed friction surface comprised of selected percentages of a metal and metal oxide composition wherein the metal is of a type whose oxide will readily form a spinel and wherein the metal oxide is also a spinel former. The metal and metal oxide should further have a high melting point not less than 2500° F. The use of the pair of friction materials as defined herein increases significantly the high energy brake capability thus permitting a reduction in brake size, cost and complexity for a given installation.

For example in aircraft brakes, peak loading is encountered under rejected (emergency) take off (RTO) conditions. Brake design must have the capability of bringing an aircraft to a safe stop under these conditions even if they are in fact never encountered in service. Yet it is found that under the high brake temperatures encountered during an RTO, prior art brake effectiveness actually decreases when most needed. The most conventional method of meeting this problem is to increase the brake size by adding additional friction discs or the like. However, this adds both cost and weight to the brake. It is known that certain ceramics may be added to metal base friction material to increase the coefficient of friction and thus brake effectiveness. However, these additions cannot be indiscriminately made nor are they always successful. The base metal may itself be the cause of loss of effectiveness if it has a tendency to melt or soften under the extreme temperature conditions. Often the result is to obtain friction materials that are highly effective under extreme conditions, but which perform poorly under normal loadings encountered during normal landing conditions. There is a tendency for prior art high ceramic content linings to chatter, produce torque peaks, seize or weld under normal load conditions.

It is an object of the present invention to provide a friction pair composition having a high effectiveness under high energy conditions while maintaining satisfactory performance for lower or normal energy use.

It is another object of the present invention to provide a friction pair wherein one friction surface is a nickel base composition and the other friction surface is comprised of selected percentages of metal-metal oxide composite wherein the metal and metal oxide are spinel formers.

Other objects and advantages of the present invention will become apparent on consideration of the accompanying description and drawings wherein:

FIGURE 2 is a graph of a plot of coefficient of friction values for varying quantities of a selected metal oxide in one of the friction surfaces; and FIGURE 3 is a graph of a plot of coefficient of friction values for varying quantities of nickel in the other friction surface.

Figure 1:
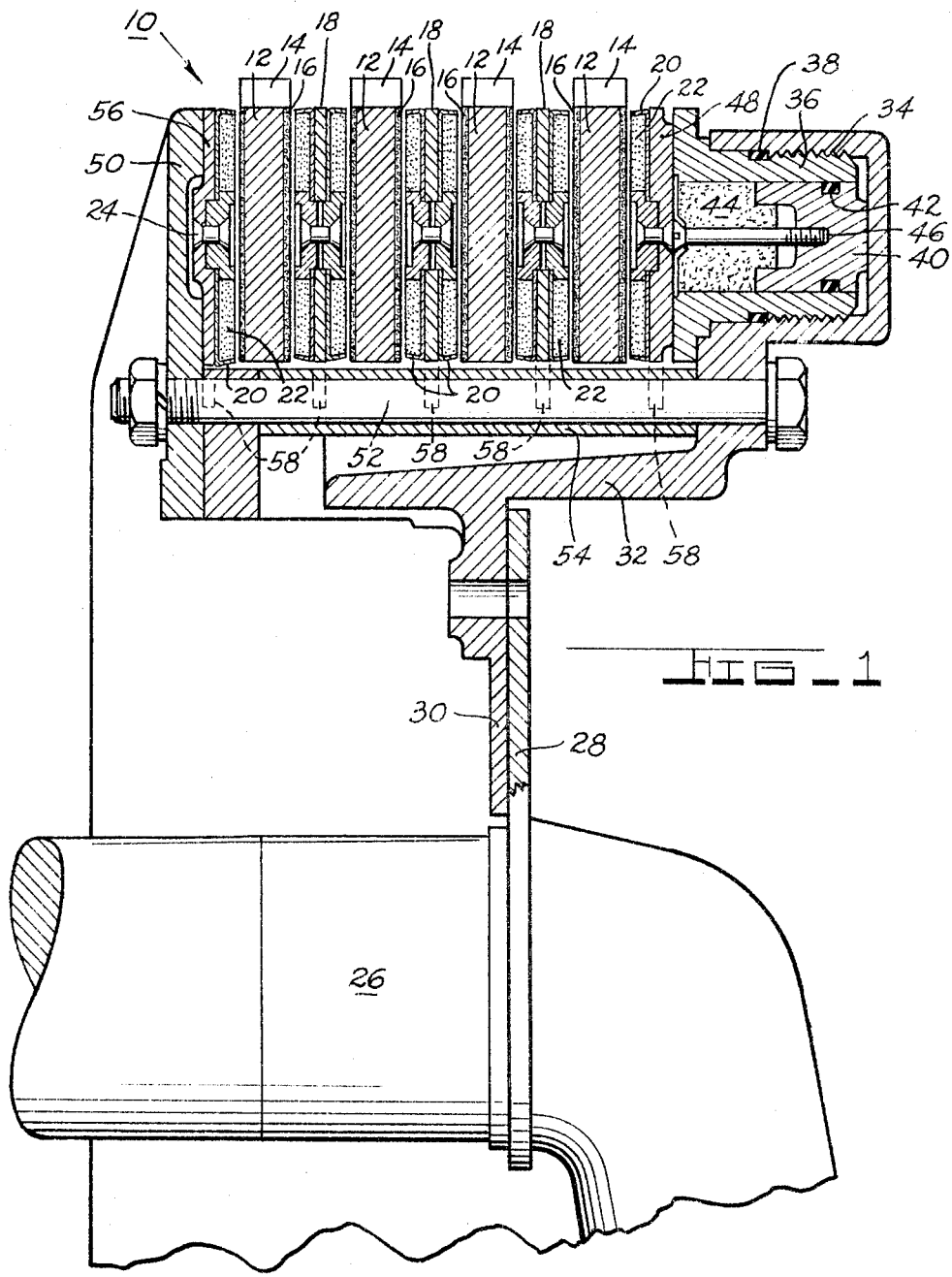
FIGURE 1 is a section view of a typical brake for effectively utilizing my friction pair.

Referring to FIGURE 1 there is shown an aircraft disc brake 10 having a plurality of annular rotor discs 12 each having slots 14 at its outer periphery for driving engagement with a wheel, not shown. In the preferred embodiment each rotor disc is coated or covered with a friction material indicated by numeral 16 having a composition and properties to be described in detail.

Intermediate each rotor disc there is disposed an annular stator disc member 18 having secured to each side a retaining cup 20 containing a friction material 22 of a type to be later described in detail. Cups 20 on opposed sides are fastened to the stator disc by a common rivet connection 24. The brake is adapted to be supported on a wheel axle 26 having a flange 28 by means of brake flange 30 formed as part of a fixed nonrotatable brake carrier 32. The carrier 32 extends radially along one side of the stack of interleaved rotor and stator discs and has formed therein threaded bores 34 providing cylindrical actuator piston chambers. A protective liner sleeve 36 is threaded in the bore 34 and sealed by packing 38. An actuator piston 40 is disposed in sleeve 36 and is sealed by packing 42. A block of insulating material 44 is attached by screw 46 for unitary movement with piston 40. Intermediate piston 40 and the end rotor 12, there is disposed an annular wear plate 48 which is similar to the stator 18 with the exception that retaining cup 20 and friction material 22 is attached to one side adjacent the rotor.

On the opposite side of the rotor and stack there is disposed a reaction plate 50 which is secured by axially extending bolts 52 to the carrier 32. A spacer sleeve 54 is concentrically mounted on bolts 52 and establishes the spacing between reaction plate 50 and pistons 40. Intermediate reaction plate 50 and end rotor 12 there is disposed a torque plate 56. The torque plate has retaining cups 20 and friction material 22 secured to one side facing the rotor 12.

Each of the stator plates, the pressure plate, and the torque plate have projections 58 formed on their inner radial edge for slidable engagement with the fixed axially extending sleeve or other fixed brake structure to provide a nonrotative connection for transmitting braking torque.

In operation, pressurized fluid is applied to the chamber formed by piston 40 and bore 34 of carrier 32 to move the piston axially towards the brake stack. As all members except the end reaction plate are axially movable, the brake stack is compressed bringing into frictional engagement each pair of friction surfaces 16 and 22. Retraction means are not illustrated and normally would consist of a spring bias displacing the brake members in the retracted position in the absence of pressurized actuating fluid.

It is currently conventional practice to utilize a sintered copper or iron base friction material either retained in cups as shown or brazed to the face of one of the disc members. Examples of such materials are described in commonly assigned U.S. Patent 2,784,105, issued March 5, 1957, in the names of Frances E. Stedman and Robert C. Pocock. Generally these materials would operate against a common steel disc which material is selected because of its low cost and good wear properties.

For comparison purposes certain tests were conducted on current production materials which were selected from those now in use on one of the commercial multi-jet engine aircraft in the heavy duty class as set forth below.

COMPARISON EXAMPLE

Frictional data was obtained in a test installation conducted at energy levels somewhat higher than those normally encountered in the field. A chart setting forth the comparison of selected test parameters with those encountered in normal service is set forth below:

| Comparison Parameter | Test Condition | Present A/C RTO Energy Condition | Present A/C Normal Energy Condition |
|---|---|---|---|
| (1) Rotor Mass Loading (ft.-lbs. of energy/lb. of rotor) | 529,000 | 447,000 | 228,000 |
| (2) Primary Heat Sink Loading (ft.-lbs. of energy/lb. of heat sink) | 331,500 | 264,500 | 135,000 |
| (3) Lining Area Loading (ft.-lbs. of energy/sq. inch of lining) | 54,900 | 37,500 | 19,150 |

The tests were conducted on a 12¾ inch outside diameter×7⅜ inch inside diameter single surface disc brake utilizing twelve equally spaced 2⅜ inch diameter lining buttons.

The lining buttons consisted of a sintered copper base composition of the following composition:

|  | Percent |
|---|---|
| Cu | 60 |
| Mo | 5 |
| Mullite | 20 |
| $SiO_2$ | 5 |
| Graphite | 10 |

The rotor was comprised of AMS6385 Steel.

For the materials described under the high energy loading set forth for the test condition described above, the coefficient of friction obtained was .21. This value is entered for reference purposes as a dashed line on the graphs of FIGURES 2 and 3 as representative of a current heavy duty friction material and its friction coefficient under the test conditions.

A series of tests were then conducted under the same test conditions as in the comparison example except for friction surface composition. The measured coefficient of friction and rotor coating composition for these tests are set forth in Table I below.

increase in friction pair effectiveness over this range. While the full curve exceeds the prior art copper-steel friction pair effectiveness a certain increase was predictable by substituting the more temperature resistant nickel for copper in the lining buttons. The increase in effectiveness from 30 to 90% oxide content above the coefficient .26 was not predictable and represents a significant and unexpected improvement over prior art materials.

Tests 7–9 are plotted on FIGURE 2 as single points identified by numbers corresponding to the test numbers. The results of these tests agree closely with the chromium-chromium oxide curve demonstrating that both metal and oxide may be substituted while maintaining good results. I have found that these good results can be obtained as long as the metal and metal oxide substitutions are confined to the group of metal whose oxides are spinel formers and if the oxides are confined to spinel forming oxides and spinels. A further limitation is that both metal and oxide must have a melting point not appreciably less than 2500° F. Both nickel and cobalt have spinel forming oxides and nickel oxide, cobalt oxide and nickel chromate spinel are either spinels or spinel forming oxides.

In test 10 the iron oxide was the non-spinel forming $Fe_2O_3$ rather than the spinel structured $Fe_3O_4$. This test point is plotted on FIGURE 2 in terms of its acceptable oxide content (chromium oxide) and agrees closely with the chromium-chromium oxide curve. If this point were plotted in terms of total oxide, both chromium and iron oxide content, it would depart considerably from the curve demonstrating the absence of any synergistic effect attributed to the non-spinel forming iron oxide.

Tests 11 and 12 each included a quantity of non-spinel forming zirconium oxide in addition to acceptable spinel forming nickel and chromium oxides. These points are also plotted in terms of the acceptable oxide content. Test point 12 is most striking as the poor effectiveness demonstrates that zirconium oxide not only did not contribute to increased effectiveness, but was definitely detrimental, compare tests 3 and 12.

Test 13 included titanium and titanium oxide both of

TABLE I

| Test No. | Composition of Rotor Surface (Volume Percent) | | | | | | | | | | | | Coefficient of Friction |
|---|---|---|---|---|---|---|---|---|---|---|---|---|---|
| | Cr | Ni | Co | Fe | Ti | Chromium Oxide | Nickel Oxide | Cobalt Oxide | Iron Oxide | Titanium Oxide | Zirconium Oxide | $NiO.Cr_2O_3$ | |
| 1 | 100.0 | | | | | | | | | | | | .262 |
| 2 | 73.0 | | | | | 27.0 | | | | | | | .265 |
| 3 | 56.0 | | | | | 44.0 | | | | | | | .304 |
| 4 | 44.0 | | | | | 56.0 | | | | | | | .306 |
| 5 | 25.0 | | | | | 75.0 | | | | | | | .298 |
| 6 | | | | | | 100.00 | | | | | | | .217 |
| 7 | | 26.3 | | | | 51.2 | 21.7 | | | | | | .307 |
| 8 | | 28.6 | | | | | 20.6 | | | | | 44.5 | .298 |
| 9 | | | 41.1 | | | 26.1 | | 30.5 | | | | | .319 |
| 10 | | | | 26.3 | | 35.2 | | | 34.4 | | | | .275 |
| 11 | | 11.8 | | | | | 28.7 | | | | 50.7 | | .272 |
| 12 | 51.7 | | | | | 37.7 | | | | | 4.0 | | .240 |
| 13 | | | | | 39.0 | 37.6 | | | | 17.0 | | | .243 |

All tests in Table I involved use of button friction material having 35.8 volume percent Ni, 30.5 volume percent Mullite, 31.3 volume percent Graphite, and 2.4 volume percent Molybdenum.

For all tests in Table I the lining buttons consisted of the following composition:

| Material | Weight percent | Volume percent |
|---|---|---|
| Nickel | 65 | 35.8 |
| Molybdenum | 5 | 2.4 |
| Mullite | 20 | 30.5 |
| Graphite | 10 | 31.3 |

Tests 1–6 are plotted and connected by a curve in FIGURE 2 and illustrate a bell shaped curve having a high plateau area from 30–90% oxide indicating a marked which are not spinel formers, and the results are predictably poor.

As will be observed the increased effectiveness is achieved with the use of high melting point spinel forming metals and metal oxides. Some non-spinel forming oxides appear to have a passive effect and do not contribute to effectiveness as do all the tested spinels and spinel forming oxides. Some non-spinel forming oxides have a definite negative effect.

The tests recorded in Table I were all run with high nickel content lining buttons for the opposed friction surface. It is known to those skilled in the art that ceramic and graphite contents can be varied to tailor a lining to a specific application. It is further known to those skilled in the art that minor additions of metals such as molybdenum may be made to tailor its properties to a specific application. Minor variations or the absence of these additions are not an avoidance of the present invention which basically requires a nickel base lining while permitting substantial variation in the amount of nickel and in the additives. Table II set forth below illustrates some of the typical variations that may be made in the nickel base lining while indicating other changes which cannot be made.

TABLE II

| Test No. | Composition of Button Friction Material (Volume Percent) | | | | | | Coefficient of Friction |
|---|---|---|---|---|---|---|---|
| | Ni | Cu | Mo | Mullite | Al₂O₃ | Graphite | |
| 14 | 35.8 | -------- | 2.4 | 30.5 | ---------- | 31.3 | .304 |
| 15 | 24.8 | 11.0 | 2.4 | 30.5 | ---------- | 31.3 | .260 |
| 16 | 13.3 | 22.5 | 2.4 | 30.5 | ---------- | 31.3 | .230 |
| 17 | 5.5 | 30.3 | 2.4 | 30.5 | ---------- | 31.3 | .178 |
| 18 | -------- | 35.8 | 2.4 | 30.5 | ---------- | 31.3 | .175 |
| 19 | 38.2 | -------- | ---- | 30.5 | ---------- | 31.3 | .337 |
| 20 | 35.8 | -------- | 2.4 | ---------- | 30.5 | 31.3 | .319 |

All tests in Table II involved using a rotor surface having 56 volume percent Chromium and 44 volume percent Chromium Oxide.

For all tests recorded in Table II an optimum rotor coating was used comprised 56 volume percent chromium and 44 volume percent chromium oxide. In order to determine the minimum permissible nickel content, copper was substituted in increasingly larger percentages for the nickel. Tests 15 through 18 show a gradual and almost linear reduction of friction coefficient for decreased nickel content. The results of tests 14–18 are plotted on FIGURE 3. Approximately 10 volume percent of nickel is required to achieve results as good as the conventional friction materials.

In test 19 the minor molybdenum addition was eliminated whereas in test 20 mullite was substituted by aluminum oxide. The friction coefficient for both tests remained high and were in fact higher than in prior tests. However, to maintain smooth performance at lower or normal energy levels, graphite, molybdenum and less abrasive ceramics may in many cases be preferred.

The selected tests set forth illustrate an improved friction pair composition which in its broadest definition is comprised of one nickel base surface having a nickel content greater than 10 volume percent and a second surface comprised of a metal and metal oxide or spinel mixture. The second surface is comprised of metal, metal oxides or spinels which either are or have the capability of forming a spinel and have melting points above 2500° F. The proportion of oxide and/or spinel is 30 to 90 volume percent of the second surface. The specific metals within the above definition found suitable are chomium, nickel, cobalt and iron and would include mixtures of two or more of these metals. Suitable oxides are any of the spinel forming oxides of the aforementioned metals, spinels such as nickel chromate, magnesium chromate or magnesium aluminate and mixtures of these oxides and spinels. It should be further understood that certain small amounts of metal or oxide additives outside the scope of those enumerated herein may be added for special purposes or even relatively large quantities of passive materials such as graphite, iron oxide or like may be tolerated without avoiding the minimum requirements of the invention as set forth herein and defined in the claims.

I claim:

1. A friction pair comprising a first nickel base metal-ceramic surface containing at least 10% by volume of nickel, a second opposing surface containing from 30% to 90% by volume metal oxide dispersed in a metal phase, said metal oxide selected from the group consisting of spinels, oxides which readily form spinels or mixtures thereof having a melting point in excess of 2500° F., and said metal phase is a metal or mixture of metals whose oxides readily form a spinel and have a melting point in excess of 2500° F.

2. A friction pair comprising a first nickel base metal-ceramic surface containing at least 10% by volume of nickel, a second opposing surface containing from 30% to 90% by volume metal oxide dispersed in a metal phase, said metal oxide selected from the group consisting of spinels, chromium oxide, nickel oxide, cobalt oxide and mixtures thereof, and said metal phase is a metal selected from the group consisting of chromium, nickel, cobalt, iron and mixtures thereof.

3. A friction pair comprising a first nickel base metal-ceramic composite wherein the nickel phase is greater than 10% by volume, a second opposing surface containing from 30% to 90% by volume metal oxide dispersed in a metal phase, said metal oxide selected from the group consisting of chromium oxide, nickel oxide, cobalt oxide, nickel chromate spinel, magnesium chromate spinel, magnesium aluminate spinel, and mixtures thereof, and said metal phase is a metal selected from the group consisting of chromium, nickel, cobalt, iron and mixtures thereof.

References Cited by the Examiner

FOREIGN PATENTS 897,681    5/1962    Great Britain.

MILTON BUCHLER, *Primary Examiner.*

G. E. A. HALVOSA, *Assistant Examiner.*